(12) United States Patent
Baden et al.

(10) Patent No.: US 12,722,789 B2
(45) Date of Patent: Sep. 1, 2026

(54) FIREPROOF SWIVEL TYPE ACCESS DOOR FOR ENGINE NACELLE

(71) Applicant: Spirit AeroSystems, Inc., Wichita, KS (US)

(72) Inventors: Pete E. Baden, Wichita, KS (US); Joe E. Sternberger, Wichita, KS (US); Andrew Joseph Niles, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 158 days.

(21) Appl. No.: 18/140,357

(22) Filed: Apr. 27, 2023

(65) Prior Publication Data

US 2024/0359804 A1 Oct. 31, 2024

(51) Int. Cl.
*B64D 29/08* (2006.01)
*B64D 45/00* (2006.01)

(52) U.S. Cl.
CPC ............. *B64D 29/08* (2013.01); *B64D 45/00* (2013.01); *B64D 2045/009* (2013.01)

(58) Field of Classification Search
CPC ... B64D 29/08; B64D 45/00; B64D 2045/009
See application file for complete search history.

(56) References Cited

U.S. PATENT DOCUMENTS 2,783,007 A * 2/1957 Nociti .................... B64D 29/06 244/129.4
2005/0207866 A1* 9/2005 Attanasio .................. B64C 1/12 411/353
2017/0369188 A1* 12/2017 Bulumulla ................ B64F 5/60
2020/0130811 A1* 4/2020 Crawford .................. B64C 7/02
2020/0290746 A1 9/2020 Kroeger et al.
2023/0053784 A1* 2/2023 Nikolaus ................... F02C 7/24

FOREIGN PATENT DOCUMENTS

EP 3789303 A1 3/2021

OTHER PUBLICATIONS

European Search Report, Europe Patent Application No. 24172113.3, dated Aug. 12, 2024, 9 pages, Europe Patent Office, Munich, Germany.

* cited by examiner

*Primary Examiner* — Kimberly S Berona
*Assistant Examiner* — Steven J Shur
(74) *Attorney, Agent, or Firm* — Stinson LLP

(57) ABSTRACT

A swivel access structure for an engine nacelle, including a door plate, a first fastener, second fasteners, a door frame, and one or more flame shields. The door plate is selectively rotatable about the first fastener, and the second fasteners selectively release the door plate to allow its rotation about the first fastener from a closed configuration to an open configuration. The door plate is rotatably attached to the door frame via the first fastener. The door frame has a frame opening covered by the door plate when the door plate is in the closed configuration and exposed when the door plate is in the open configuration. The one or more flame shields cover an inner side of the door plate and/or an inner side of the door frame. The swivel access structure provides access within the nacelle without spring arrangements that are more susceptible to fail fire testing.

20 Claims, 5 Drawing Sheets

4A
16
32
26
20
30
30
40
4A
32
32
34

20
30
28
32
34
24
16
26
40

22

FIREPROOF SWIVEL TYPE ACCESS DOOR FOR ENGINE NACELLE

BACKGROUND

An aircraft engine nacelle generally surrounds an aircraft engine and fan, among other components associated therewith. The nacelle can include an inlet cowl, a fan cowl, and a thrust reverser. The inlet cowl encircles an area forward of the fan, the fan cowl surrounds and covers the fan, and the thrust reverser generally surrounds and covers a core of the engine.

Small access doors are typically required on nacelles for various types of access requirements, such as access for tools used to manually lock out a pneumatic valve or otherwise view or access components of the engine accessory drive gearbox without opening the fan cowls or fan cowl doors. These access doors are typically spring-loaded to automatically return to the closed position via return spring force. Depending on the specific location of the access doors of the fan cowl, such doors are required to be fireproof for fire safety reasons. Recent interpretations of airworthiness regulations have made it increasingly difficult to pass fire tests on these small access doors. One mode of failure is the spring losing its temper in the fire exposure which allows the door to open and the flame to pass through. Furthermore, standard heat blanket insulation protection of a small door can be complex and impractical.

Thus, there is a need for improved methods and apparatuses for a mechanic to access or check items within the nacelle that does not suffer from these and other disadvantages.

SUMMARY

In one or more embodiments of the invention, a swivel access structure for an engine nacelle includes a door plate, a first fastener, one or more second fasteners, a door frame, and one or more flame shields. The door plate with an outer side and an inner side opposite the outer side is selectively rotatable about the first fastener. The one or more second fasteners selectively fix the door plate in a closed configuration and selectively release the door plate to allow its rotation about the first fastener from the closed configuration to an open configuration. The door plate is rotatably attached to the door frame via the first fastener. The door frame has an outer side, an inner side opposite the outer side, and a frame opening formed through the door frame. The frame opening is covered by the door plate when the door plate is in the closed configuration and exposed when the door plate is in the open configuration. The one or more flame shields cover the inner side of the door plate and/or the inner side of the door frame. The swivel access structure provides access within the nacelle without spring arrangements that are more susceptible to fail fire testing.

In another embodiment, an engine nacelle includes a nacelle panel with an outer surface, an inner surface, and a hole formed therethrough, as well as a door plate, a first fastener, a door frame, and one or more flame shields. The door plate has an outer side and an inner side opposite the outer side, and the door plate is selectively rotatable about the first fastener between a closed configuration and an open configuration. The door frame has an outer side, an inner side opposite the outer side, and a frame opening formed through the door frame. The frame opening is covered by the door plate when the door plate is in the closed configuration and exposed when the door plate is in the open configuration. The door frame is attached to the nacelle panel on the inner surface of the nacelle panel, with the hole of the nacelle panel aligned with the frame opening. The one or more flame shields cover the inner side of the door plate and/or the inner side of the door frame.

In yet another embodiment, a method for manufacturing a fan cowl with a swivel access structure for providing selective access for a tool to fit through the engine nacelle to reach an engine, fan or other aircraft component mounted within the engine nacelle. The method includes the steps of attaching a flame shield over an inner side of a door plate and an inner side of a door frame. The method also includes the steps of rotatably attaching the door plate to the door frame via a first fastener and fixedly attaching the door frame to an inner surface of a panel of the fan cowl. Furthermore, the method includes a step of inserting one or more second fasteners through fastener holes of the door plate. The one or more second fasteners may selectively engage and disengage with fastener holes of the door plate to fix the door plate over a frame opening of the door frame in a closed configuration and to release the door plate to pivot away from the frame opening in an open configuration.

This summary is intended to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in more detail below with reference to the attached drawing figures, wherein.

Figure 5:
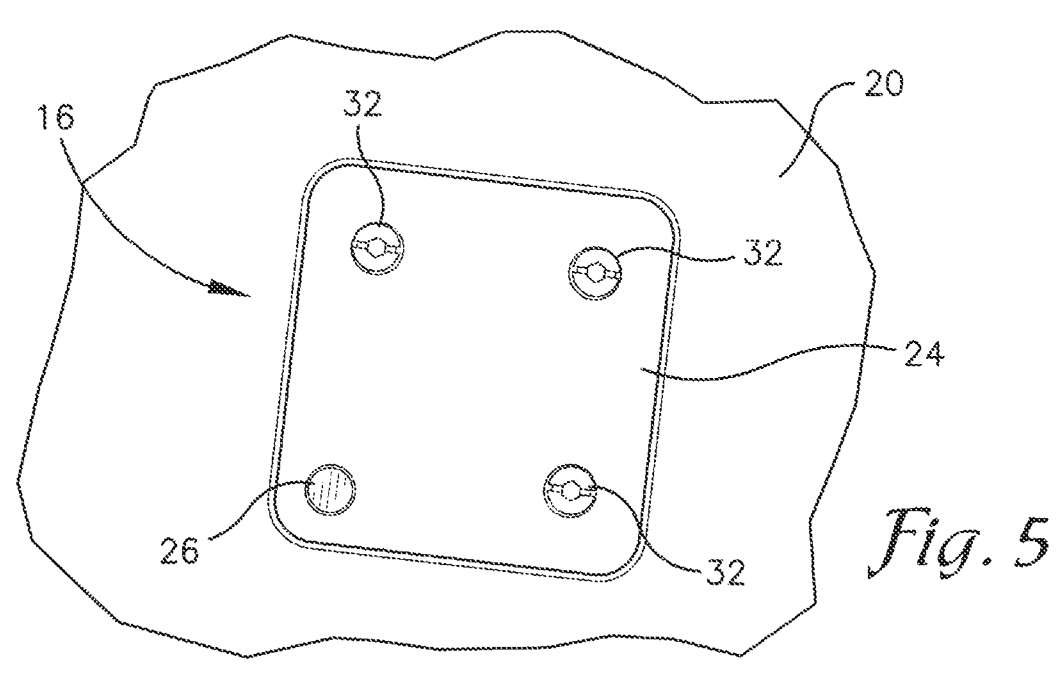
FIG. 5 is a fragmentary side elevation view of the outer side of the fan cowl panel of the lower fan cowl with the swivel access structure of FIG. 3 with a door plate in a closed configuration, in accordance with embodiments of the present invention.
Figure 6:
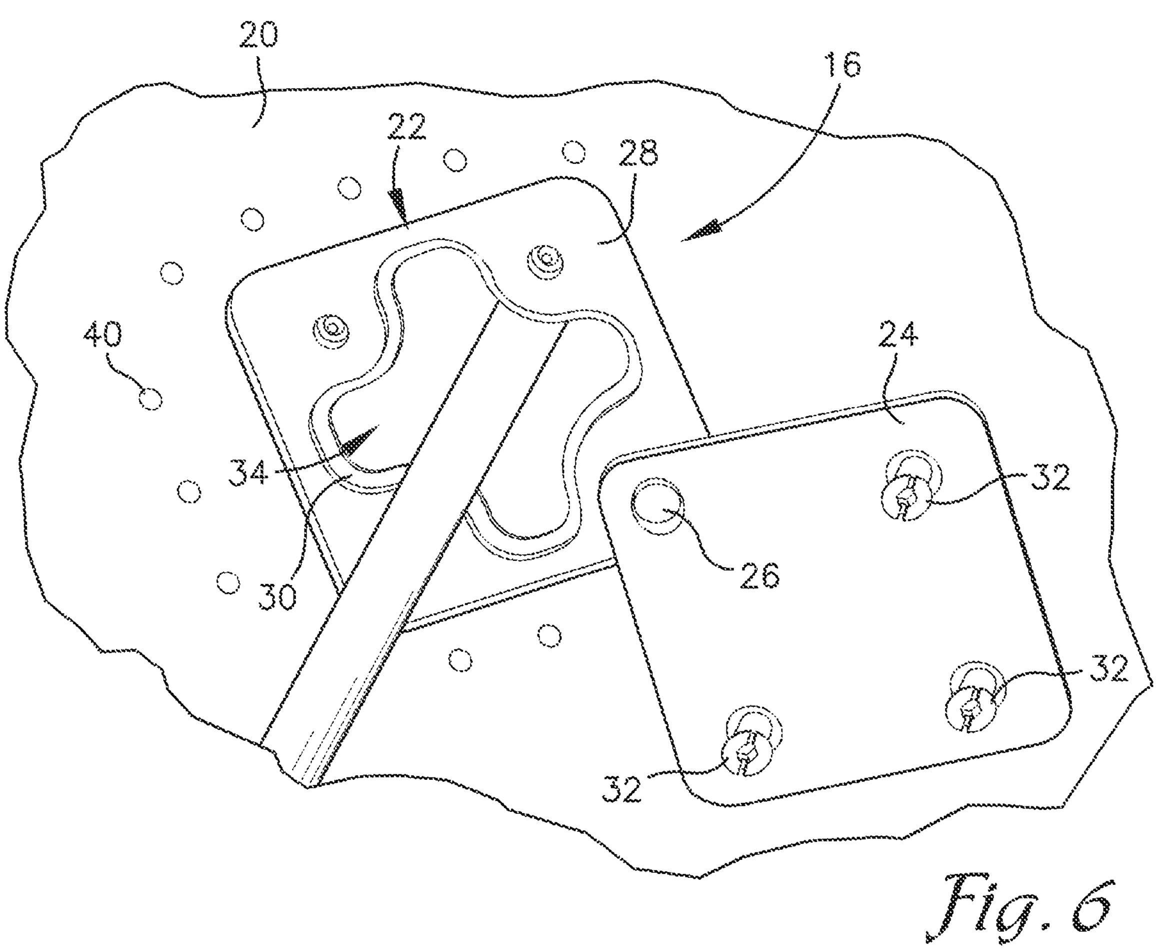
Figure 7:
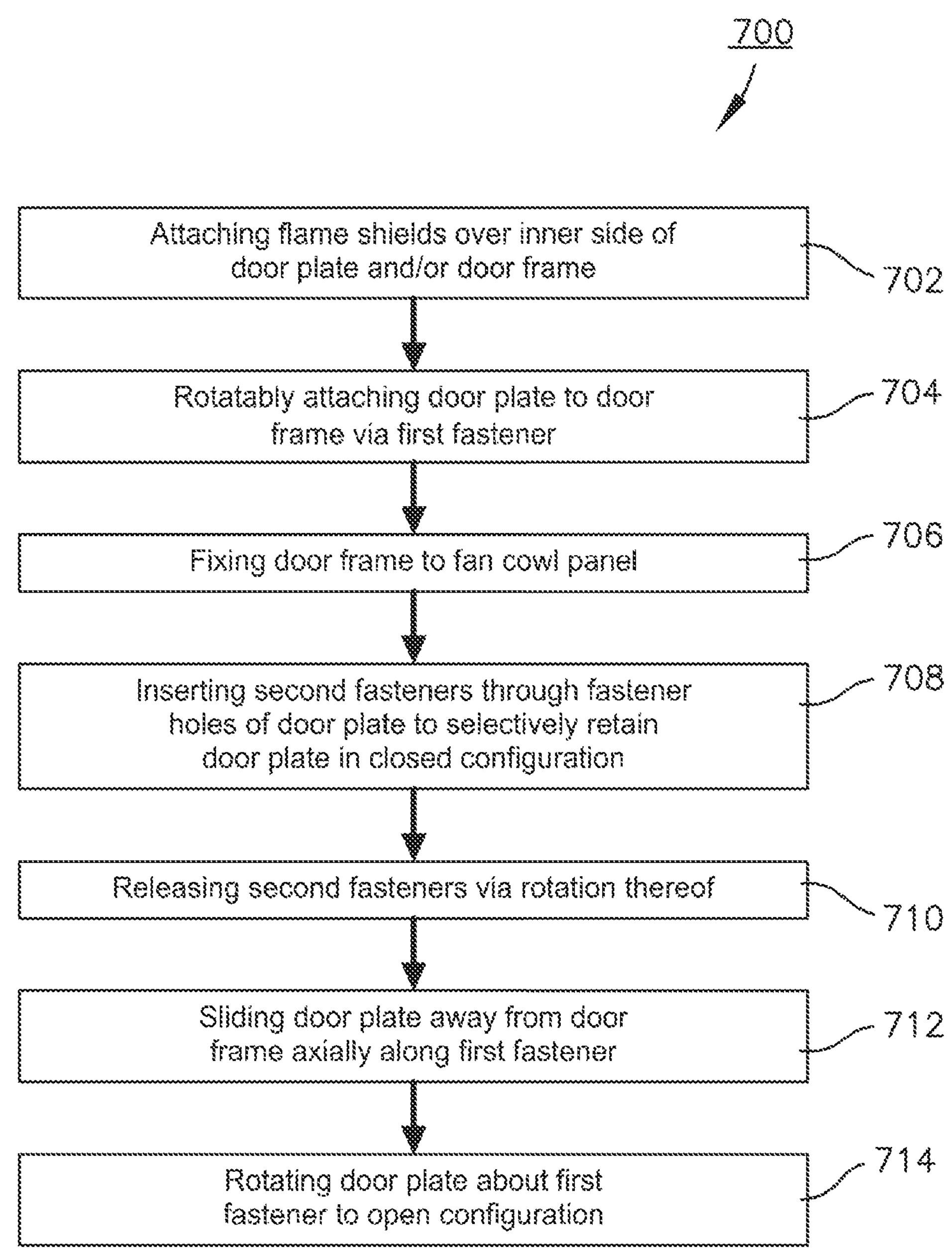

FIG. 6 is a fragmentary perspective view of the outer side of the fan cowl panel of the lower fan cowl with the swivel access structure of FIG. 5 with the door plate in an open configuration, in accordance with embodiments of the present invention; and FIG. 7 is a flow chart of a method for manufacturing a fan cowl with a swivel access structure, in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized, and changes can be made, without departing from the scope of the claims. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the present technology can include a variety of combinations and/or integrations of the embodiments described herein.

Figure 1:
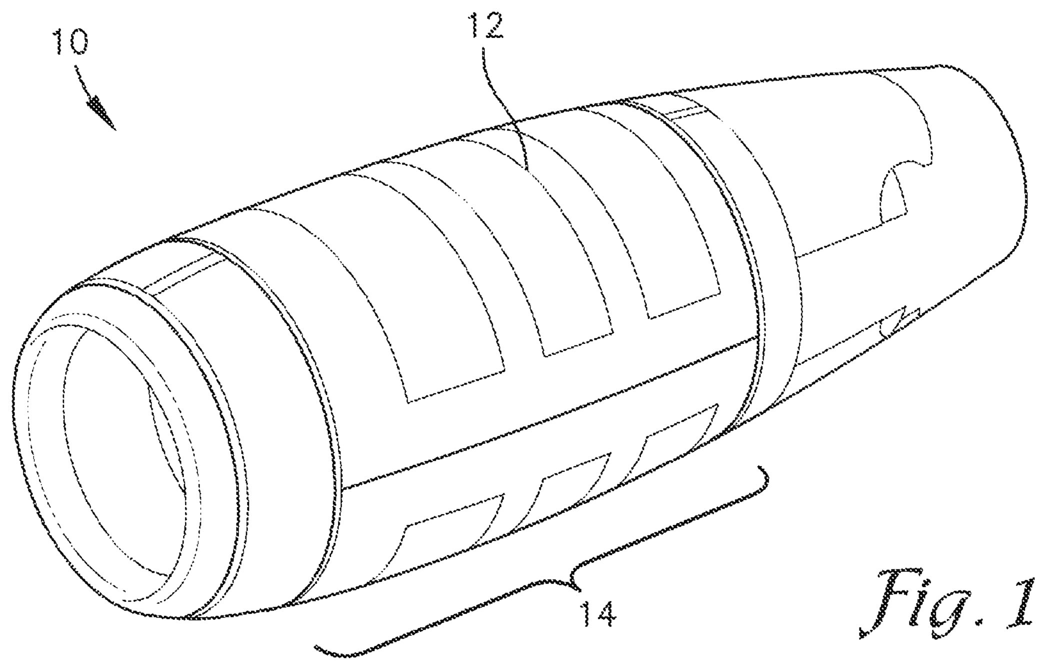
FIG. 1 is a side elevation perspective view of an engine nacelle and its fan cowl, in accordance with embodiments of the present invention.
Figure 2:
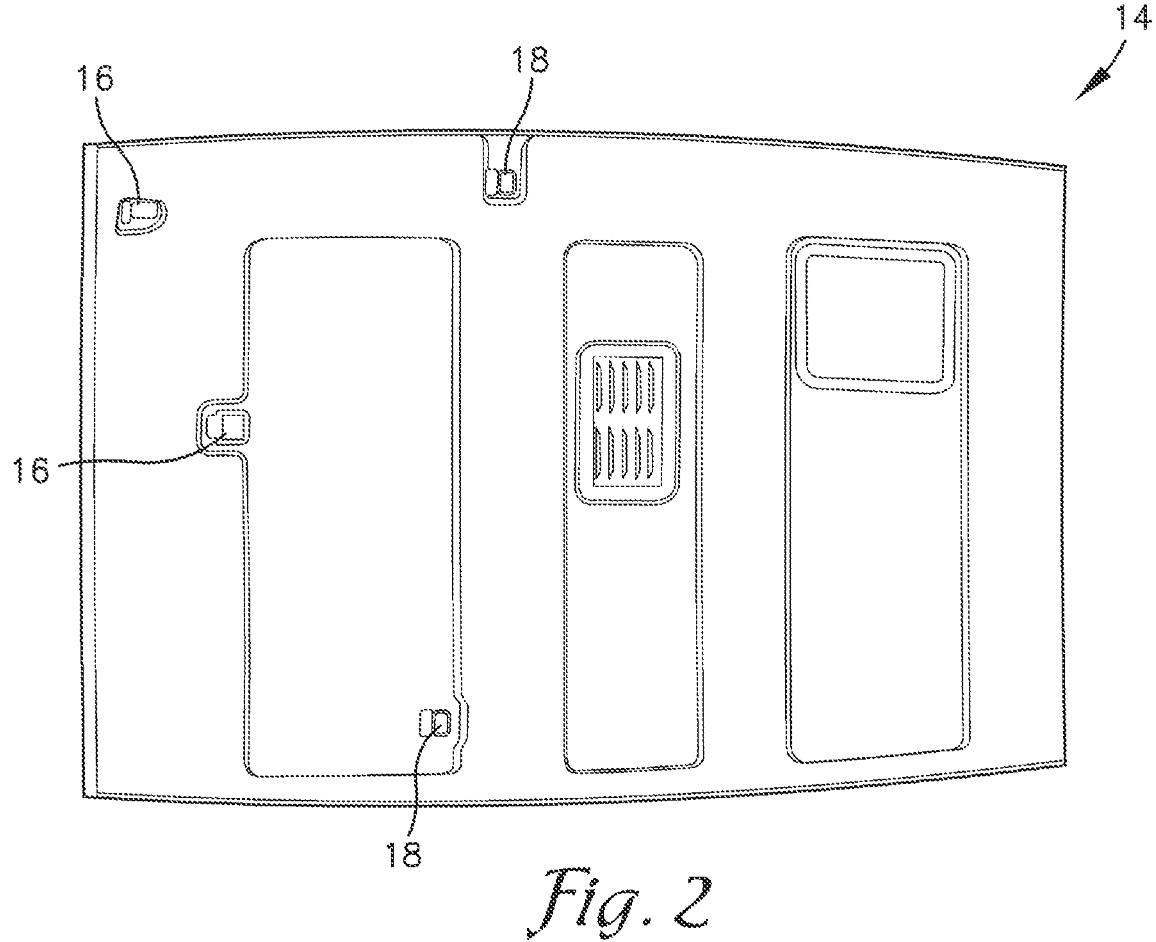
FIG. 2 is a bottom view of a lower fan cowl of the nacelle of FIG. 1, in accordance with embodiments of the present invention.

FIG. 1 depicts an engine nacelle 10 of an aircraft, including a fan cowl 12. The engine nacelle 10 may have any configuration known in the art and may have an aircraft engine and an aircraft fan (not shown) located therein. Furthermore, FIG. 2 depicts a lower fan cowl 14 of the fan cowl 12 of FIG. 1, including at least one swivel access structure 16 and one or more sight-viewing structures 18, through which oil levels within the nacelle 10 (e.g., oil levels of the aircraft engine accessory gearbox) can be viewed. The swivel access structure 16 replaces traditional access doors such as a starter air valve (SAV) remote lockout access door and a nacelle anti ice (NAI) remote lockout access door, avoiding the use of traditional access door springs that can be more susceptible to fail fire testing requirements. Although depicted with two swivel access structures 16 and two sight-viewing structures 18, note that one or more than two of the swivel access structures 16 and/or the sight-viewing structures 18 may be used without departing from the scope of the technology described herein. Furthermore, in some embodiments, the sight-viewing structures 18 can be omitted without departing from the scope of the invention described herein.

Fire testing requirements used for aerospace may be outlined by the Society of Automotive Engineers (SAE), International Organization for Standardization (ISO) (e.g., ISO 2685), Federal Aviation Administration (FAA) (e.g., Advisory Circular AC20-135 Change 1), European Aviation Safety Agency (EASA), and/or other regulatory agencies. For example, the swivel access structure 16 or at least one component thereof may be configured for withstanding a temperature of 2,000-degrees Fahrenheit for at least 15 minutes in order to pass such fire tests.

Figure 3:
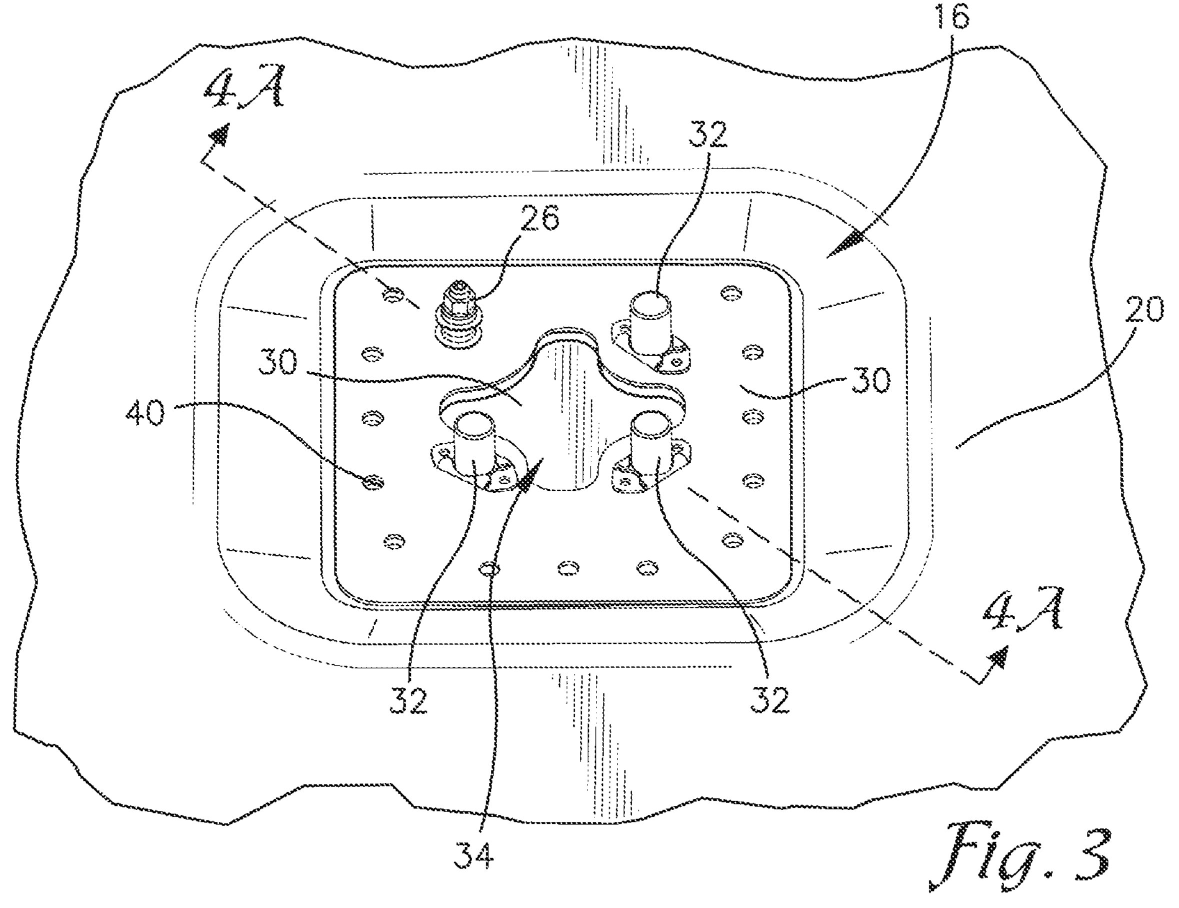
FIG. 3 is a fragmentary side elevation view of an inner side of a fan cowl panel of the lower fan cowl of FIG. 2 with a swivel access structure, in accordance with embodiments of the present invention.
Figures 4A, 4B:
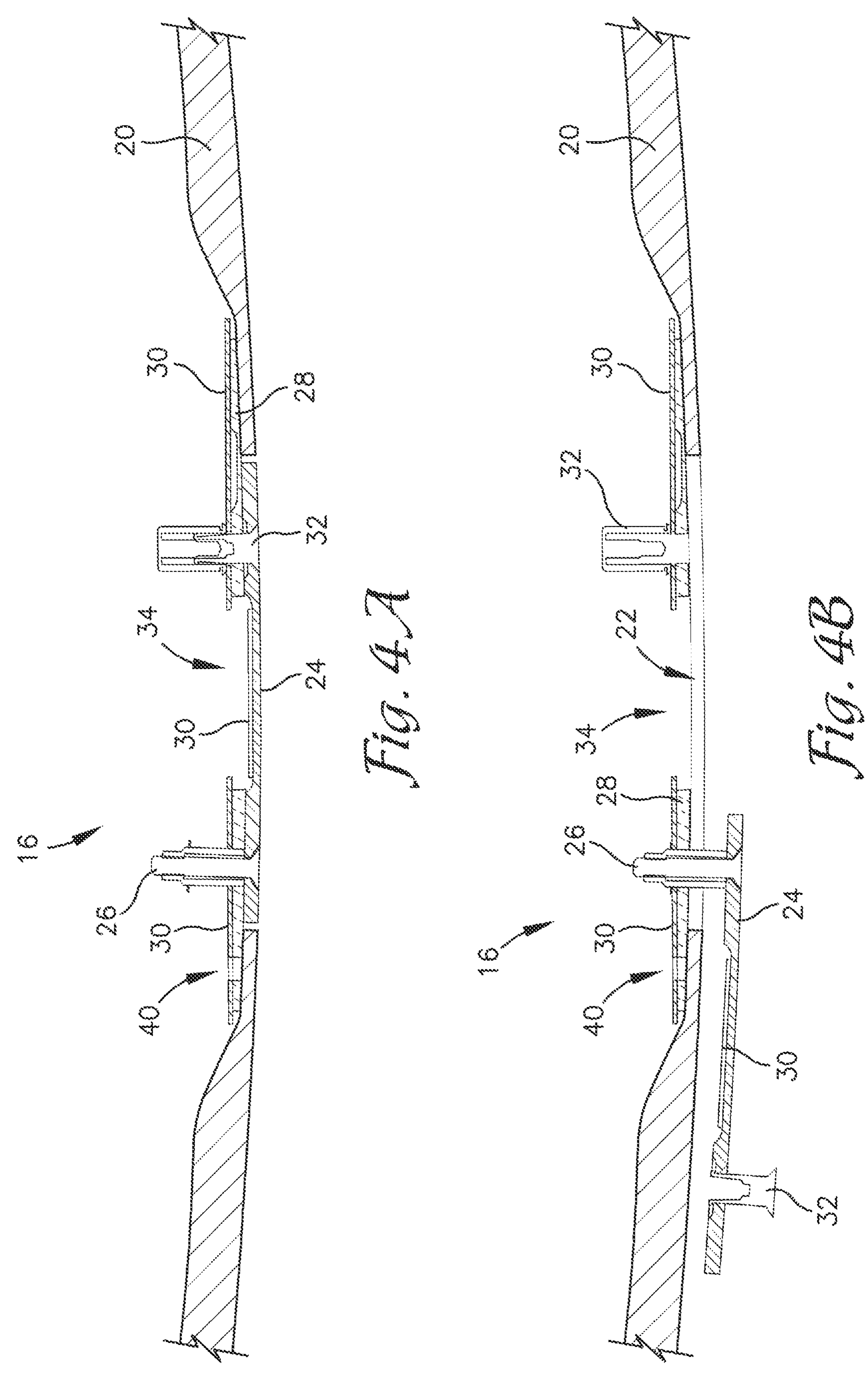
FIG. 4A is a cross-sectional view of the fan cowl panel and the swivel access structure taken along line 4A-4A in FIG. 3, depicted in a closed configuration, in accordance with embodiments of the present invention.
FIG. 4B is a cross-sectional view of the fan cowl panel and the swivel access structure of FIG. 4A, depicted in an open configuration, in accordance with embodiments of the present invention.

In one or more embodiments, as depicted in FIGS. 3-6, a fan cowl panel 20 of the fan cowl 12 can have the swivel access structure 16 attached thereto and aligned or at least partially positioned through a hole 22 in the panel 20 (see FIG. 4B). The panel 20 can have an inner surface facing inward relative to the nacelle 10 (e.g., toward the fan and/or engine) and an outer surface opposite the inner surface and facing outward relative to the nacelle 10.

The swivel access structure 16 includes a door plate 24, a first fastener 26, a door frame 28, and one or more flame shields 30. Furthermore, some embodiments also include one or more second fasteners 32. The swivel access structure 16 provides access within the nacelle without spring arrangements that are more susceptible to fail fire testing, as depicted in FIGS. 4A, 4B, and 6.

The door plate 24 has an outer side and an inner side opposite the outer side and is selectively rotatable or configured to selectively rotate about the first fastener 26. The door plate 24 can be made out of a composite material or any rigid metal known in the art of aerospace, such as titanium and may include one or more of the flame shields 30. In a closed configuration, as depicted in FIG. 4A, the door plate 24 may rest flush with the panel 20 or an outer surface of the panel 20. However, in an open configuration, as depicted in FIG. 4B, the door plate 24 may slide outward away from the nacelle and then may pivot or rotate about the first fastener 26, as later described herein. The door plate 24 can include holes formed therethrough for placement of the first fastener 26 and the second fasteners 32.

The first fastener 26 may be any pivot pin known in the art, such as a swivel bolt or pin fastener (e.g., a Hi-Lok with a sleeve). In some embodiments, the first fastener 26 extends through axially-aligned holes formed through the door plate 24 and the door frame 28, respectively. The first fastener 26 may have a sufficient length such that the door plate 24, in some configurations, is rotatable about the first fastener 26, but also axially-slidable along an axis of the first fastener 26 in a direction away from the panel 20 and out of the hole 22 to provide clearance for pivoting or rotating of the door plate 24 into the open configuration.

The one or more second fasteners 32 may selectively fix the door plate 24 in the closed configuration and selectively release the door plate 24 to allow the door plate 24 to rotate about the first fastener 26 from the closed configuration to an open configuration. Three of the second fasteners 32 are depicted, but other quantities of second fasteners 32 can be used without departing from the scope of the technology described herein. The second fasteners 32 may be captive fasteners or cam-lock fasteners configured to release the door plate 24 when turned in a first direction by a first amount. For example, the door plate 24 may be configured to slide away from the door frame 28 axially along the first fastener 26 when the one or more second fasteners 32 are actuated to release the door plate 24. This allows the second fasteners 32 to remain attached to the door frame 28 and/or the door plate 24 even when the door plate 24 has been released, so that no components are lost when the door plate 24 is moved into the open configuration. For example, as depicted in FIG. 6, one portion of the second fasteners 32 can remain attached to the door frame 28 while another portion of the second fasteners 32 can remain attached to the door plate 24 when the door plate 24 is in the open configuration. Likewise, the door plate 24 remains secured to the door frame 28 in both the open and the closed configurations, advantageously preventing the door plate 24 from being lost by complete removal from the door frame 28 when opening.

The door frame 28 has an outer side, an inner side opposite the outer side, and a frame opening 34 formed through the door frame 28. The door frame 28 may be mounted within the nacelle 10 on an inner surface of the panel 20, with the outer side of the door frame 28 facing the inner surface of the panel 20 and with the frame opening 34 radially inward of the hole 22 formed through the panel 20. In one or more embodiments, the frame opening 34 is covered by the door plate 24 when the door plate 24 is in the closed configuration, and the frame opening is exposed when the door plate 24 is in the open configuration. That is, the frame opening 34 is accessible in the open configuration such that a tool can pass from outward of the nacelle 10, at least partially through the frame opening 34, and thus at least partially into the nacelle 10. That is, the hole 22 through the nacelle 10 fan cowl panel 20 and the frame opening 34 is configured to provide selective access for a tool to fit through the engine nacelle to reach an engine, fan, or other aircraft component mounted within the engine nacelle 10. The door frame 28 may be made of steel, titanium, composite, or other such fireproof materials used in the art of aerospace components. The frame opening 34 has an area that is smaller than an area of the door plate 24, such that the door plate 24 completely covers the frame opening 34 in the closed configuration.

The one or more flame shields 30 cover the inner side of the door plate 24 and/or the inner side of the door frame 28. For example, one of the flame shields 30 may cover the inner side of the door plate 24 and face components within the nacelle 10. Furthermore, one of the flame shields 30 may cover the inner side of the door frame 28, facing components within the nacelle 10, and may have an opening aligned with the frame opening 34. In some embodiments, the flame shields 30 are each made of a composite panel comprised of two or more, three or more, or five or more composite plies consolidated into a composite laminate. The composite panel may, for example, be formed of carbon fibers, fiberglass fibers, or ceramic fibers. However, other flame shield material can be used without departing from the scope of the technology herein. The flame shield may be configured with sufficient layers of heat shielding and/or composite material to allow for the swivel access structure 16 to withstand required aerospace fire testing. Such testing requirements used for aerospace may be outlined by the SAE, ISO (e.g., ISO 2685), FAA (e.g., Advisory Circular AC20-135 Change 1), EASA, and/or other regulatory agencies. For example, the swivel access structure 16 and/or its flame shields 30 may be configured for withstanding a temperature of 2,000-degrees Fahrenheit for at least 15 minutes in order to pass such fire tests. However, the flame shields 30 can be configured to withstand other heat limits without departing from the scope of the technology described herein.

The swivel access structure 16 can include additional components without departing from the scope of the technology described herein. In one or more embodiments, the swivel access structure 16 includes fastener holes 40 through the panel 20 and/or the door frame 28. Securing fasteners (not shown) may extend through the fastener holes 40 to bolt or otherwise mechanically secure the door frame 28 to the panel 20. The securing fasteners for the door frame 28 can include, for example, Hi-Loks in a plurality of locations outward of the frame opening 34.

The flow chart of FIG. 7 depicts in more detail the steps of an exemplary method 700 for manufacturing a fan cowl (e.g., the fan cowl 12) of a nacelle (e.g., the nacelle 10) with a swivel access structure 16 is depicted in FIGS. 2-6 for providing tool access from outside of the fan cowl 12 into the fan cowl 12 without opening the fan cowl 12. In some embodiments of the invention, various steps may be omitted and/or steps may occur out of the order depicted in FIG. 7 without departing from the scope of the invention. For example, two blocks shown in succession in FIG. 7 may in fact be executed substantially concurrently, or blocks may sometimes be executed in the reverse order depending upon the functionality involved.

The method 700 includes the step of attaching one or more of the flame shields 30 over the inner side of the door plate 24 and/or the inner side of the door frame 28, as depicted in block 702. As described above, the flame shields 30 may each be a composite panel made of two or more, 3 or more, or 5 or more composite plies consolidated into a composite laminate.

The method 700 may also include a step of rotatably attaching the door plate 24 to the door frame 28 via the first fastener 26, as depicted in block 704, and fixedly attaching the door frame 28 to the inner surface of the panel 20 of the fan cowl 12, as depicted in block 706. This can be accomplished via fastener holes 40 as depicted in FIGS. 3, 4, and 6, through which any mechanical fasteners such as standard aerospace fasteners can be inserted in order to fix the door frame 28 to the panel 20.

The method 700, in one or more embodiments, may further comprise a step of inserting one or more of the second fasteners 32 through fastener holes of the door plate 24, as depicted in block 708. As described above, the one or more second fasteners 32 are configured to selectively engage and disengage with fastener holes of the door plate to fix the door plate over the frame opening 34 in the door frame 28 in the closed configuration and to release the door plate 28 to pivot away from the frame opening 34 into the open configuration, as depicted in FIG. 6.

In one or more embodiments, the method 700 includes a step of releasing the second fasteners 32, as depicted in block 710. Specifically, step 710 includes using a tool (e.g., a screwdriver) to turn the second fasteners in a first direction by a first amount for disengaging with the door plate 24 and/or portions of the second fasteners 32 attached to the door plate 24. Note that the first direction can be clockwise or counterclockwise, and the first amount can be any amount dictated by the design of the second fasteners 32, such as a quarter turn, a half turn, a full turn, or even multiple turns by a tool configured to mate with features, divots, or protrusions of the second fasteners 32.

In one or more embodiments, the method 700 may also include a step of sliding the door plate 24 away from the door frame 28 axially along the first fastener 26, as depicted in block 712, when the one or more second fasteners 32 are actuated to release the door plate 24. To complete a transition from the closed to the open configuration, the method 700 may also include a step of rotating the door plate 24 about the first fastener 26, as depicted in block 714, to a location such that the door plate 24 is not covering the frame opening 34. This allows the insertion of tooling through the frame opening 34 and the hole 22, such that items within the nacelle 10 can be accessed by a technician for adjustment or fixing thereof.

Although the invention has been described with reference to example embodiments illustrated in the attached drawing figures, it is noted that equivalents may be employed, and substitutions made herein, without departing from the scope of the invention as described and claimed herein.

Having thus described one or more embodiments of the invention, what is claimed as new and desired to be protected by Letters Patent includes the following:

The invention claimed is:

1. A swivel access structure for an engine nacelle, comprising:

a door plate having an outer side and an inner side opposite the outer side;

a first fastener having an axis normal to the outer side of the door plate, wherein the door plate is selectively rotatable about the axis of the first fastener;

one or more second fasteners configured to selectively fix the door plate in a closed configuration, wherein the one or more second fasteners are configured to selectively release the door plate from the closed configuration such that it is selectively rotatable about the first fastener to an open configuration;

a door frame with an outer side, an inner side opposite the outer side, and a frame opening formed through the door frame, wherein the first fastener extends through the door frame and the door plate, wherein the frame opening is covered by the door plate in the closed configuration and the frame opening is exposed when the door plate is in the open configuration; and one or more flame shields covering at least one of the inner side of the door plate and the inner side of the door frame.

2. The swivel access structure of claim 1, wherein the one or more flame shields are comprised of at least one composite panel made of two or more composite plies consolidated into a composite laminate.

3. The swivel access structure of claim 2, wherein the at least one composite panel is made of five or more composite plies and the at least one composite panel is formed of carbon fibers, fiberglass fibers, or ceramic fibers.

4. The swivel access structure of claim 1, wherein the one or more second fasteners are captive fasteners or cam-lock fasteners configured to release the door plate when turned in a first direction by a first amount.

5. The swivel access structure of claim 1, wherein the door plate is configured to slide away from the door frame axially along the first fastener when the one or more second fasteners are actuated to release the door plate.

6. The swivel access structure of claim 1, wherein the first fastener is a swivel bolt or pin fastener.

7. The swivel access structure of claim 1, wherein the one or more flame shields include at least one flame shield covering the inner side of the door plate and at least one flame shield covering the inner side of the door frame, with a flame shield opening aligned with the frame opening.

8. The swivel access structure of claim 1, further comprising a fan cowl panel with an outer surface, and inner surface, and a cowl opening formed through the fan cowl panel, wherein the door frame is attached to the inner surface of the fan cowl panel, with the outer side of the door frame facing the inner surface of the fan cowl panel.

9. An engine nacelle comprising:

a nacelle panel with an outer surface, an inner surface, and a hole formed therethrough;

a door plate having an outer side and an inner side opposite the outer side;

a first fastener having an axis normal to the outer side of the door plate, wherein the door plate is selectively rotatable about the axis of the first fastener between a closed configuration and an open configuration;

a door frame with an outer side, an inner side opposite the outer side, and a frame opening formed through the door frame, wherein the first fastener extends through the door frame and the door plate, wherein the frame opening is covered by the door plate in the closed configuration and the frame opening is exposed when the door plate is in the open configuration, wherein the door frame is attached to the nacelle panel on the inner surface of the nacelle panel, with the hole of the nacelle panel aligned with the frame opening; and one or more flame shields covering at least one of the inner side of the door plate and the inner side of the door frame.

10. The engine nacelle of claim 9, wherein the one or more flame shields are comprised of at least one composite panel made of two or more composite plies consolidated into a composite laminate.

11. The engine nacelle of claim 10, wherein the at least one composite panel is made of five or more composite plies and the at least one composite panel is formed of carbon fibers, fiberglass fibers, or ceramic fibers.

12. The engine nacelle of claim 9, further comprising one or more second fasteners configured to selectively fix the door plate in the closed configuration, wherein the one or more second fasteners are configured to selectively release the door plate from the closed configuration such that it is selectively rotatable about the first fastener to the open configuration.

13. The engine nacelle of claim 12, wherein the one or more second fasteners are captive fasteners or cam-lock fasteners configured to release the door plate when turned in a first direction by a first amount, wherein the door plate is configured to slide away from the door frame axially along the first fastener when the one or more second fasteners are actuated to release the door plate.

14. The engine nacelle of claim 9, wherein the first fastener is a swivel bolt or pin fastener.

15. The engine nacelle of claim 9, wherein the one or more flame shields include at least one flame shield covering the inner side of the door plate and at least one flame shield covering the inner side of the door frame, with a flame shield opening aligned with the frame opening.

16. The engine nacelle of claim 9, further comprising a fan cowl, wherein the nacelle panel is one of a plurality of nacelle panels forming the fan cowl.

17. The engine nacelle of claim 9, wherein the hole through the nacelle panel and the frame opening is configured to provide selective access for a tool to fit through the engine nacelle to reach an engine, fan, or other aircraft component mounted within the engine nacelle.

18. A method for manufacturing a fan cowl with a swivel access structure for providing selective access for a tool to fit through the engine nacelle to reach an engine, fan, or other aircraft component mounted within the engine nacelle, the method comprising:

attaching a flame shield over an inner side of a door plate and an inner side of a door frame;

rotatably attaching the door plate to the door frame via a first fastener such that the door plate is rotatable about an axis of the first fastener normal to an outer side of the door plate;

fixedly attaching the door frame to an inner surface of a panel of the fan cowl; and inserting one or more second fasteners through fastener holes of the door plate, wherein the one or more second fasteners are configured to selectively engage and disengage with fastener holes of the door plate to fix the door plate over a frame opening in the door frame in a closed configuration and to release the door plate to pivot away from the frame opening into an open configuration.

19. The method of claim 18, wherein the flame shield is a composite panel made of five or more composite plies consolidated into a composite laminate.

20. The method of claim 18, wherein the one or more second fasteners are captive fasteners or cam-lock fasteners configured to release the door plate when turned in a first direction by a first amount.

* * * * *